United States Patent [19]

Matsumura et al.

[11] Patent Number: 4,575,211
[45] Date of Patent: Mar. 11, 1986

[54] DISTANCE MEASURING DEVICE

[75] Inventors: Susumu Matsumura; Yuichi Sato; Takashi Kawabata; Tokuichi Tsunekawa, all of Kanagawa, Japan

[73] Assignee: Canon Kabushiki Kaisha, Tokyo, Japan

[21] Appl. No.: 601,054

[22] Filed: Apr. 16, 1984

[30] Foreign Application Priority Data

Apr. 18, 1983 [JP] Japan ................................. 58-68641
Apr. 18, 1983 [JP] Japan ................................. 58-68643
Apr. 18, 1983 [JP] Japan ................................. 58-68650
Apr. 19, 1983 [JP] Japan ................................. 58-68656

[51] Int. Cl.$^4$ ........................ G03B 13/20; G01C 3/06
[52] U.S. Cl. ....................................... 354/403; 356/1
[58] Field of Search ................ 354/403; 250/201 AF; 356/1

[56] References Cited

U.S. PATENT DOCUMENTS

| 4,310,227 | 1/1982 | Zinchuk | 356/1 X |
| 4,371,261 | 2/1983 | Tsuji | 356/1 |
| 4,441,810 | 4/1984 | Momose | 354/403 X |
| 4,470,681 | 9/1984 | Johnson | 354/403 |

Primary Examiner—William B. Perkey
Attorney, Agent, or Firm—Toren, McGeady, Stanger, Goldberg & Kiel

[57] ABSTRACT

The disclosed distance measuring device is arranged to project light on an object. Reflected light from the object is received by a photo-electric converter to shift the position of a photo-taking lens to an in-focus position on the basis of a signal produced from the photo-electric converter. The projected light and/or the reflected light is divided into a multiplicity of light fluxes for the purpose of broadening and simplifying the distance measuring range and accuracy.

6 Claims, 28 Drawing Figures

4,575,211

DISTANCE MEASURING DEVICE

BACKGROUND OF THE INVENTION

1. Field of the Invention

This invention relates to a distance measuring device and more particularly to a so-called active type distance measuring device arranged to project a distance measuring light on an object and to receive a reflected light from the object.

2. Description of the Prior Art

FIG. 1 of the accompanying drawings schematically shows an active-type distance measuring device of the prior art disclosed in Japanese Laid-Open Patent Application No. SHO 54-113356. The device of FIG. 1 includes a light emitting element ED1 which projects the light; a photo-electric converting element PD1 for receiving light; lenses LS1 and LS2 of a view finder optical system a half-mirror MR1; a total reflection mirror MR2; a frame FM for indicating a finder visual field and a distance measurement part; the eye EY of the photographer; and a light projecting lens LS3 disposed in front of the light emitting element ED1. The light from the light emitting element ED1 passes through the lens LS3 and is then reflected by a turning mirror MR4 for projection onto and scanning an object. Reflected light from an object is condensed by a lens LS4. The condensed light thus reflected strikes a light receiving or photo-sensitive thus reflected comes to a light receiving or photo-sensitive element PD1.

A photo-taking lens system LS5 is disposed within a lens barrel in a known manner. The lens system LS5 is shiftable back and forth together with the lens barrel along its optical axis. FIG. 1 further shows a diaphragm AD; a shutter SH; a film FL; a spring SP1 urging the lens barrel to move inwardly; a rack LG; a pinion G1 arranged to engage the rack LG; a ratchet G2 which rotates in one unified body with the pinion G1; a magnet Mg1 arranged to be controlled by a circuit which will be described later herein; an armature lever AM which is pivotally carried to be attracted by the magnet Mg1 and is provided with a stop pawl AM1 arranged to engage the teeth of the ratchet wheel G2; a spring SP2 arranged to urge the stop pawl SP2 to engage the ratchet wheel G2; an object Ob1 which is to be photographed and is located at a short distance; and another object Ob2 which is to be photographed and is located at a long distance. FIG. 2 is a graph showing signals produced from the photo-electric converting element PD1. The abscissa shows time (t) and the ordinate axis output voltage (V). Curve Q1 represents an output produced by a reflected light coming from the short distance object Ob1. Curve Q2 represents an output produced by a reflected light coming from the long distance object Ob2. The mirror MR4 turns in response to the movement of the lens barrel to scan objects with the light emitted from the light emitting element ED1 in the direction from the nearest distance point towards an infinite distance point. The photo-electric converting element PD1 receives reflected light from the object. When a peak value of signals produced from the element PD1 is detected, magnet Mg1 turns off. The spring SP2 pulls the stop pawl AM1 of the armature lever AM to engage the ratchet wheel G2. With the pawl engaged with the ratchet wheel, movement of the lens barrel is stopped by the pinion G1 and the rack LG to fix the position of the photo-taking lens LS5.

Measuring distances in the above-stated manner by projecting a distance measuring light flux of an approximately circular sectional shape projected onto an object to be photographed, has produced the following problem:

Where the object to be photographed is two persons 2a and 2b located somewhat away from each other as shown in FIG. 3, the scanning distance measuring light flux passes through a space between the two persons while the light flux is moving from a point 1b to another point 1a. Under such a condition, it is impossible to accurately measure a distance to the object. This problem has necessitated an additional distance measuring process. The camera is set once to have one of the two persons located in the center of the picture frame. The camera retains the distance information thus obtained and the camera is then "reset" to a position which will achieve the actually desired picture composition. Thus, it has been necessary to carry out a series of photographic processes.

SUMMARY OF THE INVENTION

It is a first object of the present invention to provide a light projecting device capable of broadening the projecting range of a distance measuring light flux to be projected on an object in a distance measuring system arranged to project the distance measuring light flux on an object. To attain this object, a light projecting device according to the invention is provided with an optical member which is arranged to broaden or split the light flux projected from light emitting elements into a plurality of light fluxes.

It is a second object of the invention to provide a light receiving device for receiving a reflected light flux from an object, having a photo-electric converter including a plurality of light receiving areas. The reflected light flux is broadened or split into a plurality of light fluxes to be received by the light receiving areas. A distance measurement signal is produced on the basis of signals representative of these incident light fluxes. In connection with the second object, a third object of this invention is to provide an optical member in the form of a beam splitter which is arranged either in a projection light path or in a reflected light path to broaden or split either the projection light flux or the reflected light flux into a plurality of light fluxes so that either the range of projection on the object or a reflection range from the object can be broadened.

It is a further object of the invention to provide a beam splitter which is arranged as follows: In a system arranged to broaden or split the projection light flux or the reflected light flux into a plurality of light fluxes by means of a beam splitter according to the above-stated objects, the light quantity of a zero order light and that of a first order light are mutually adjusted to permit distance measurement at a high degree of accuracy.

It is a still further object of the invention to provide a distance measuring device wherein a light flux projected a light emitting element is split or divided into a plurality of projection light fluxes. A photo-electric converter for receiving reflected light fluxes resulting from the plurality of projection light fluxes includes a plurality of light receiving parts for receiving the reflected light fluxes resulting from the plurality of projection light fluxes. The the light receiving parts are arranged to produce signals according to a scanning operation performed on the object by the light emitting element with the projection light fluxes. An an in-focus signal is produced for a scanning position at which a signal deemed to be representative of an in-focus state is produced earliest among the signals produced from the light receiving parts.

These and further objects and features of the invention will become apparent from the following detailed description of preferred embodiments thereof taken in conjunction with the accompanying drawings.

DETAILED DESCRIPTION OF THE PREFERRED EMBODIMENTS

Figure 5:
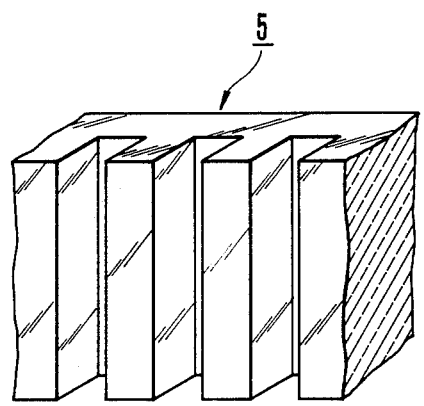
FIG. 5 is an oblique view of an optical member arranged in the first embodiment of the invention.
Figure 4:
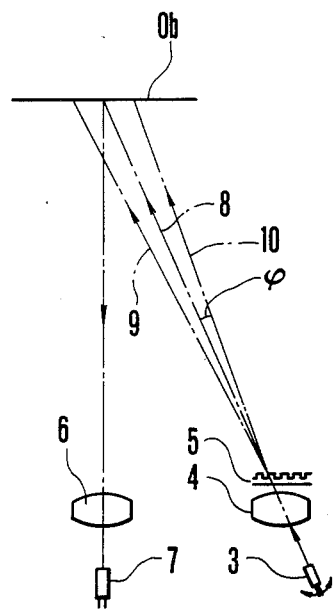
FIG. 4 is a schematic illustration showing the operating principle of a first embodiment of the present invention.

Referring to FIG. 4, a first embodiment of the present invention includes a light emission source 3 such as an LED (light emitting diode) or a semiconductor laser; a light projecting lens 4; a phase type beam splitter 5 which is disposed right behind the light projecting lens 4; and a photo-electric converting element 7. The light emission source 3 is arranged to be turned by known methods within a certain angular range relative to the light projecting lens 4. With the light emission source 3 thus turned, the surface of an object Ob to be photographed is scanned with a projected light flux spot from a near distance point to a long distance point. Since the beam splitter 5 is disposed right behind the light projecting lens in this specific embodiment, the projection light flux is diffracted into a zero order diffraction light flux 8 and "+" and "−" first order diffraction light fluxes 10 and 9. FIG. 5 is an enlarged view of the beam splitter 5 as viewed from the side of the object. The beam splitter 5 has a grating composed of evenly spaced recesses and projections and is formed in a rectangular shape with an optically transparent material of a refractive index "n". Accordingly, the three diffraction light fluxes form distance measuring light spots on the surface of the object Ob. The surface of the object Ob is scanned with the light spots as the light emission source is turned.

Figure 6:
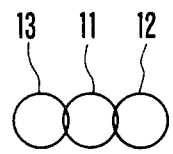
FIG. 6 is an illustration of projection light spots projected from a light emitting element of the first embodiment.

FIG. 6 shows the shapes of the projected light spots formed on a flat surface of the object when the turning movement of the light emission source is stopped at a certain angle. On one side of a spot 11 formed by the zero order diffracted light is a spot 12 formed by the "+" first order diffracted light. On the other side a spot 13 is formed by the "−" first order diffracted light. One projection light spot is thus laterally broadened three times. The spacing between the projection light spots is determined by the period P of the diffraction grating of the beam splitter disposed right behind the light projecting lens. Assuming that the first order diffraction angle is $\phi$, there obtains a relation $P \sin \phi = \lambda$, wherein $\lambda$ represents the center wave length of the projection light. The intensity of each of the light spots is determined by the degree of recess and protrusion of the diffraction grating.

Figure 7A:
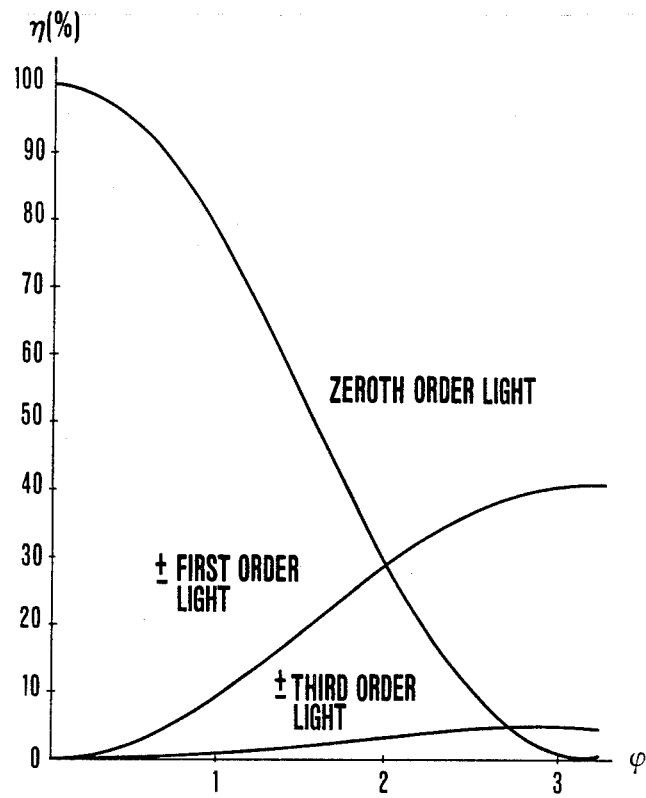
FIGS. 7A and 7B are illustrations showing a relation between the intensity of split light fluxes and that of an incident light flux obtained with a beam splitter used as an optical member.
Figure 7B:
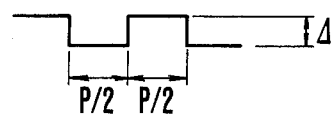

FIG. 7A shows the relation of this recessed and protruded degree $\Delta$ to the diffraction efficiency $\eta$ of the zero order and "+" and "−" first order diffraction lights (diffraction light intensity vs. incident light intensity). It is, therefore, possible to make the intensity of the three light spots about equal by adjusting the recessed and protruded degree $\Delta$ of the diffraction grating arranged as shown in FIG. 7B. Where the distance to the middle point among the spot is to be measured, the intensity of the "+" and "−" first order diffraction lights can be weakened to have a peak of intensity in the middle spot, with weak spots located on the left and right sides of the middle spot. It is also possible to lower the intensity of the middle spot and to increase the intensity of the left and right spots. In that instance, a peak value can be more readily detected in processing a received light signal.

Figure 8:
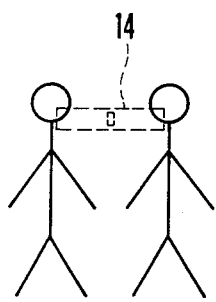
FIG. 8 is an illustration of a relation between an object to be photographed and a distance measuring light flux.

In the distance measuring device of this first embodiment, the light flux is projected on the object in a laterally long sectional shape as described. The surface of the object to be photographed is scanned with this laterally long light flux as the light emission source turns. Therefore, an object for which distance measurement cannot be accurately carried out with a conventional device can be satisfactorily scanned with a laterally broadened light flux 14 of the first embodiment as shown in FIG. 8.

Figure 9:
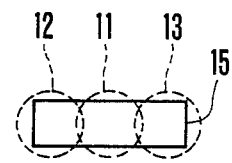
FIG. 9 is an illustration of spots on a photoelectric converting element.

While the lateral length of the projection light flux is increased as mentioned above, it is also preferable to have the lateral length of the shape of the light receiving surface of the light receiving sensor of the embodiments also increased accordingly. FIG. 9 shows a preferred shape of the light receiving surface of the sensor. As shown, the light receiving surface is preferably of a shape that an image 15 of the sensor surface which is projected backwards on the surface of the object via the light receiving lens is of about the same shape and size as the projection light flux. Then, at that instant, the received light signal has a peak value to facilitate an electrical signal processing operation for determining the object distance.

Figure 10:
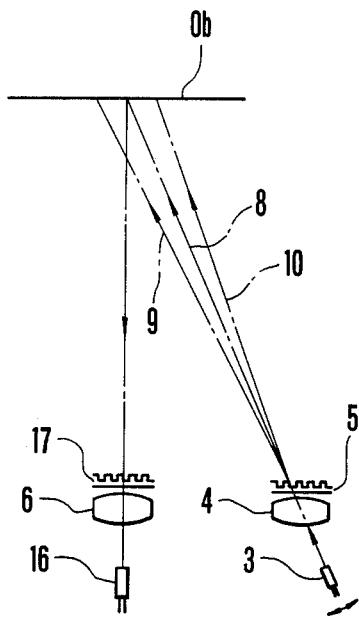
FIG. 10 through FIG. 12 are schematic illustrations showing the operating principle and arrangement of a second embodiment of the invention.
Figures 11A, 11B:
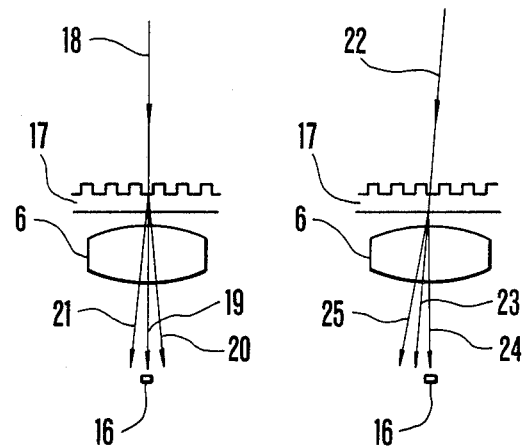

FIG. 10 shows a second embodiment of the invention. In this case, unlike the first embodiment, a beam splitter 17 is arranged in front of the light receiving lens. A light receiving photo-electric converter 16 which has a small light receiving surface size is arranged to perform substantially the same function as a photo-electric converter which has a laterally long light receiving area. Referring to FIG. 10, the reflected light flux of each of the three projected light spots on the object Ob is again diffracted by the beam splitter 17 and is thus partially received by the photo-electric converter 16. For example, as shown in FIG. 11(a), reflected light flux 18 from the light spot formed on the object by the projection light flux 8 is diffracted by the beam splitter 17. Then, zero order diffraction light flux 19 passes to a small light receiving area 16. Further, as shown in FIG. 11(b), reflected light 22 from a spot formed on the object by the projection light flux 10 is diffracted by the beam splitter 17 and then "−" first order diffraction light flux 24 passes to the light receiving area 16. Likewise, reflected light from a spot formed on the object by the projection light flux 9 is also diffracted by the beam splitter 17 and the "+" first order diffraction light flux passes to the light receiving area, though not shown in the drawing.

In this embodiment, therefore, despite the use of a photo-electric converter of smaller light receiving area than that of the first embodiment, the photo-electric converter is capable of performing virtually the same function as that of the first embodiment by virtue of the beam splitter 17.

Figure 12:
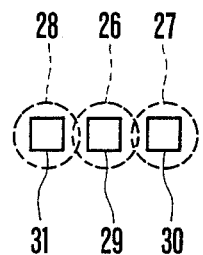

FIG. 12 shows a preferred arrangement of the beam splitter 17. Beam splitter 17 is preferably arranged to have a grating constant (period) such that when an image of the photo-electric converter 16 is projected backward on the object via the light receiving lens and the beam splitter, the three projected light spots 26, 27 and 28 have the diffracted images 29, 30 and 31 of the photo-electric converter approximately overlap them as shown in FIG. 12.

While the invention has been described with emphasis placed on the optical system thereof, the technique disclosed in Japanese Laid-Open Patent Application No. SHO 54-113356 is applicable to the electrical signal processing system of the invention. The invention solves the problems of the conventional distance measuring devices with a simple structural arrangement and thus gives a distance measuring device having a high degree of performance.

Figure 13:
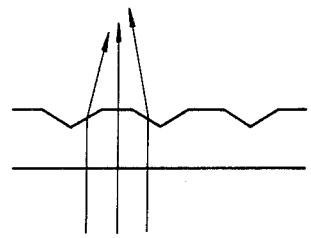
FIG. 13 is a sectional view showing a modification example of the beam splitter employed according to the invention.

In accordance with this invention, the structural arrangement of the beam splitter is not limited to the arrangement of FIG. 5. For example, the beam splitter may be arranged to have a sectional grating change as shown in FIG. 13. In addition, other grating arrangements such as a diffraction grating having a sinusoidal sectional shape may also be used as the beam splitter.

Further, in accordance with the invention, the place in which the beam splitter is to be arranged does not have to be in the neighbourhood of a lens but may be at any suitable point within the light projection or light receiving optical system.

In the embodiments described, the beam splitter is arranged to produce mainly the zero order and "+" and "−" first order diffraction light fluxes. However, the beam splitter may be arranged to produce a greater number of diffraction light fluxes.

Figure 1:
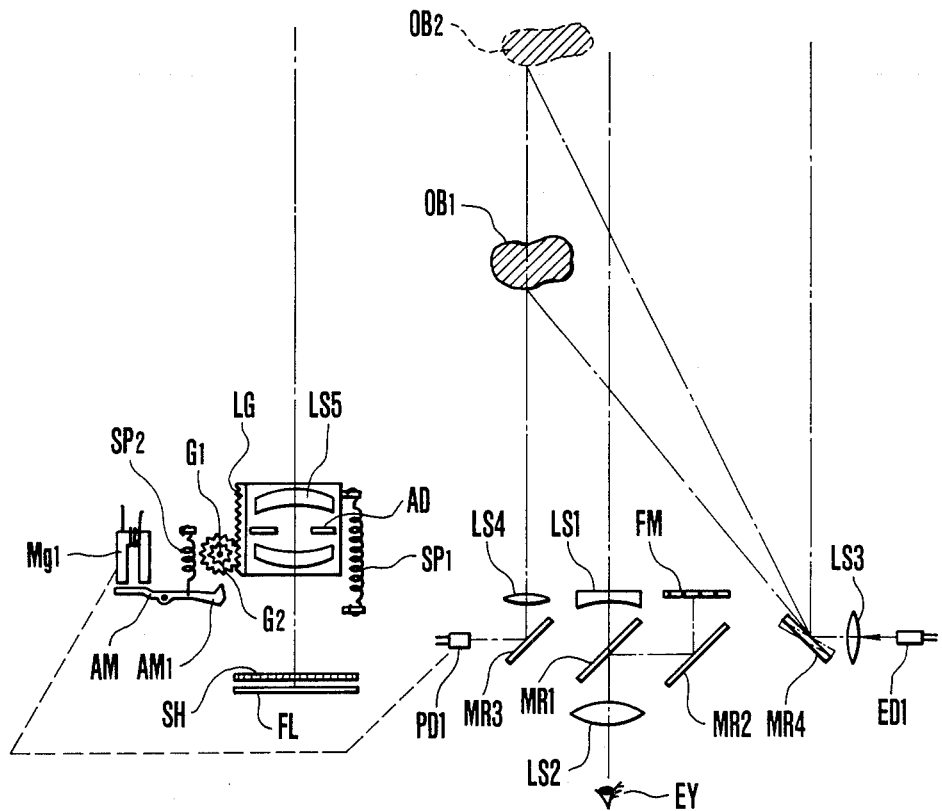
FIG. 1 is a schematic illustration of an automatic focusing system arranged to adjust a photo-taking lens to an in-focus position on the basis of a signal of a distance measuring device according to the prior art.
Figure 2:
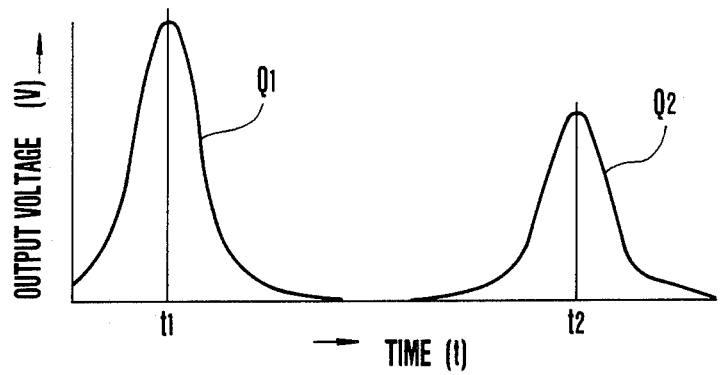
FIG. 2 is a graph showing the wave forms of distance measurement signals of the automatic focusing system shown in FIG. 1.
Figure 3:
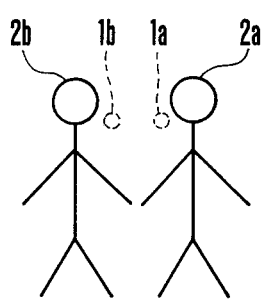
FIG. 3 is an illustration showing a reason for which the present invention has been contrived.
Figure 14:
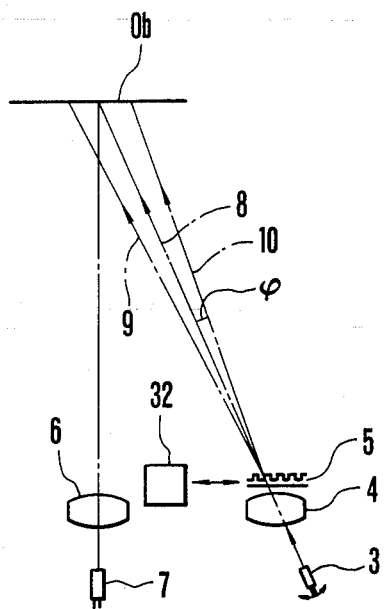
FIGS. 14 and 15 are illustrations of a third embodiment of the invention.
Figure 15:
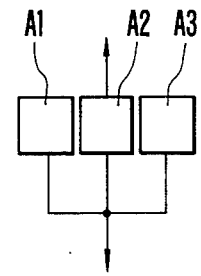

FIGS. 14 and 15 show a third embodiment of the invention. The distance measuring device of this embodiment is arranged to differentiate when there is only a single object to be photographed within a picture frame from when a plurality of objects are included in a picture frame as shown in FIG. 3. In this embodiment, the beam splitter is arranged to either be inserted in or retracted from the projection light path of the light emitting means according to the the above differentiation. In FIG. 14, the members performing the same functions as the corresponding members shown in FIG. 4 are denoted with the same reference numerals. In this case, the beam splitter 5 is arranged to be inserted in or retracted from the projection light path by some driving element 32 such as a plunger. The driving element 32 is operated at the discretion of the photographer. As shown in FIG. 15, the light receiving photo-electric converter of this embodiment consists of three small photoelectric converters A1, A2 and A3. The output of the central small photo-electric converter A2 and the sum of the outputs of all the small photo-electric converters A1–A3 are arranged to be switched over from one to the other before one of them is supplied to a signal processing circuit. The whole converter assembly A1–A3 corresponds to the photo-electric converter 15 of FIG. 9. The sum of the outputs of the converters A1–A3 is supplied to the signal processing circuit when the beam splitter is within the projection light path. The output of the central converter A2 is arranged to be supplied alone to the signal processing circuit when the beam splitter is not within the projection light path. Accordingly, the effective light receiving area of the light receiving photo-electric converter is shifted according to the size of the projection light spot. The output signal thus obtained from the light receiving photo-electric converter is processed in the same manner as the method disclosed in Japanese Laid-Open Patent Application No. SHO 54-113356. Information according to object distance is taken out and the phototaking lens is set at the optimum position.

Figure 16:
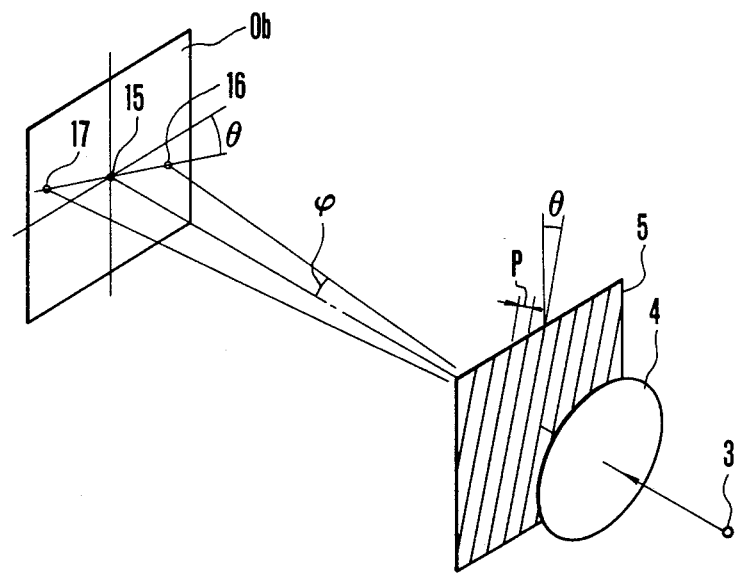
FIGS. 16 through 22 are illustrations of further embodiments of the invention.

FIGS. 16 through 20 show a fourth embodiment of the invention. In this embodiment, the plurality of projection light areas on the object receiving the projected light fluxes via the beam splitter as described in the foregoing embodiments are arranged not to overlap each other by the turning movement of the light emitting element. The projected light fluxes thus illuminate different parts of the surface of the object to permit accurate distance measurement. In FIG. 16, the members performing the same functions as the corresponding members shown in FIG. 4 are denoted with the same reference numerals. In FIG. 16, the grating line direction of the beam splitter of FIG. 4 is tilted at an angle θ from the vertical direction. FIG. 16 illustrates the beam splitter 5 by showing only the direction of the grating lines. Actually, however, the beam splitter 5 is formed by tilting the grating of FIG. 4 at an angle θ. The rays of light from the light emission source are diffracted by the beam splitter. However, the tilt of the grating line direction at the angle θ from the vertical direction causes the projected light spots 15, 16 and 17 formed on the surface of the object by the diffraction light fluxes to be in tilted alignment by as much as the angle θ from the horizontal line.

Figure 17:
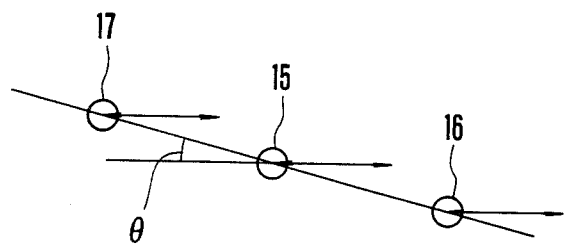
Figure 18:
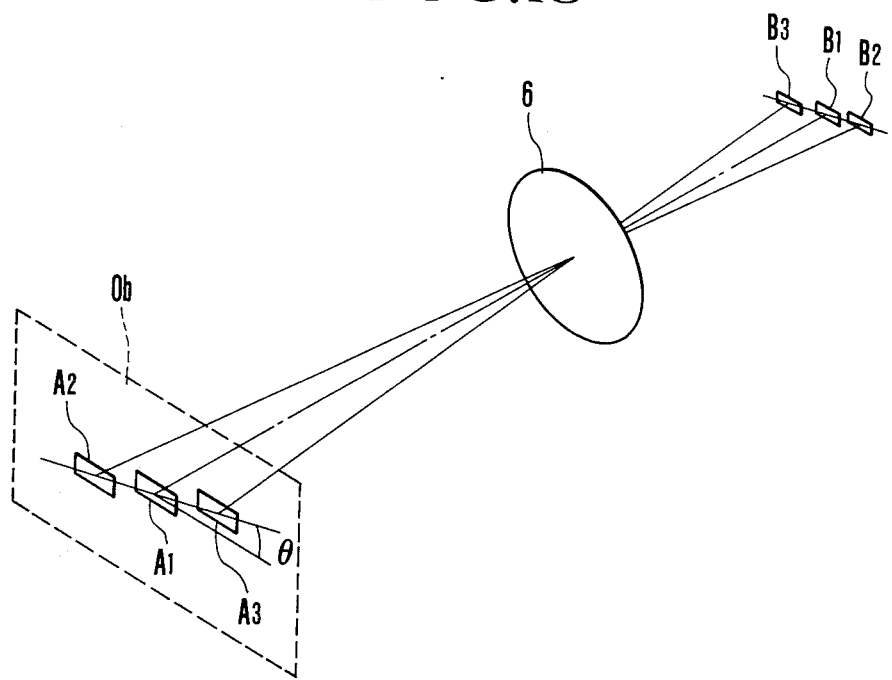
Figure 19:
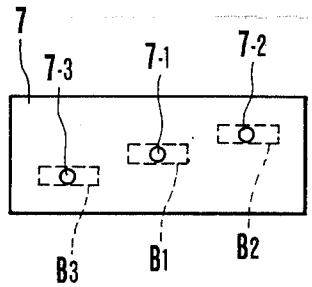
Figure 20:
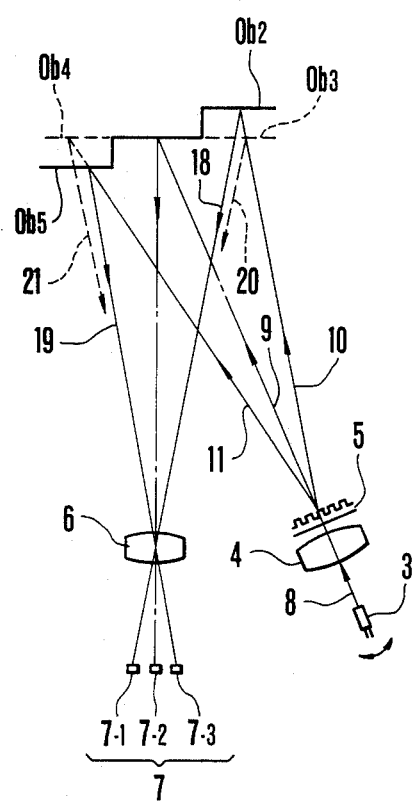

On the surface of the object to be photographed, as shown in FIG. 17, each of the projected light spots resulting from the diffraction light fluxes scans the object as the light emission source 3 turns. Accordingly, compared with a scanning operation performed solely by the projected light flux 15 without using the beam splitter, the scanning area over the surface of the object can be increased three times with the arrangement of this embodiment. Reflected and scattered light coming from each of the projected light spots scanning the surface of the object is approximately imaged, via the light receiving lens 6, into the photo-electric converter. Referring to FIG. 18, the scanning areas over the surface of the object Ob by the projected light spots are A1, A2 and A3. Images B1, B2 and B3 of these scanning areas are almost completely formed on the surface of the photo-electric converter. The photo-electric converter 7 of this embodiment 1 as shown in FIG. 19, includes three photo-electric sensors 7-1, 7-2 and 7-3, which are arranged to correspond to the three images B1, B2 and B3 of the scanning spots in such a manner as to scan within these three images. Therefore, when the surface of the object is scanned by the projected light spots, the images of the projected light spots formed via the light receiving lens move across each of the photo-electric sensors 7-1, 7-2 and 7-3. When the images of the projected light spots coincide most closely with the photo-electric sensors, these sensors produce their maximum or peak outputs. The distance to the object is obtained by measuring the required length of time after commencement of scanning by the projected light spots before the peak outputs are produced. Where the object to be photographed is such as to give different distances at different distance measuring areas, as represented by an object Ob2 in FIG. 20, the distance measuring light fluxes differ from the condition on the object surface shown in FIG. 4 and deviate sidewise. Referring to FIG. 20, a light beam or flux 18 which is reflected by an object area Ob2 and passes the central part of the light receiving lens 6 is incident on the lens 6 at a different angle from another light flux 20 which is reflected by another object area Ob3 and also passes the central part of the light receiving lens 6. The same comments also apply to other objects areas Ob4 and Ob5. Light fluxes 19 and 21 from these areas also come to the light receiving lens 6 at different incident angles. On the surfaces of the photo-electric sensors, the images of the reflected light fluxes from the object areas Ob2 and Ob4 are thus displaced sidewise from the condition shown in FIG. 4. As a result, the photo-electric sensors 7-1 and 7-3 produce output signals having their peak values at different points of time from those produced in the case of FIG. 4. Then, information on the different object distances is obtained from the lengths of time elapsed before the peak values of the output signals are obtained.

In this specific embodiment, not only distance information is obtainable for a wider range of distance measuring areas but also object distance information on each specific distance measuring area A1–A3 is obtainable. Therefore, when this distance measuring device is interlocked with an automatic focusing mechanism of a camera or the like, object distance information can be obtained beforehand for each different distance measuring area. After that, the position of a photo-taking lens can be shifted approximately according to the result of this distance measurement, so that the performance of the automatic focusing operation is enhanced.

Referring again to FIG. 18, with the distance measuring area A1 set in the center of a picture and other areas A2 and A3 in the peripheral portion of the picture, for example, the photo-taking lens can be focused solely on the central part of the picture solely according to the output of the sensor 7-1. It is also possible to take a photograph with the whole picture sharply focused by evaluating the outputs of the sensors 7-1, 7-2 and 7-3 according to some evaluation functions.

In accordance with this invention, the structural arrangement of the beam splitter is not limited to the structure shown in FIG. 5. It is also possible to have three light fluxes produced in three different directions also by means of a beam splitter having a trapezoidal sectional grating shape as shown in FIG. 13.

Figure 21:
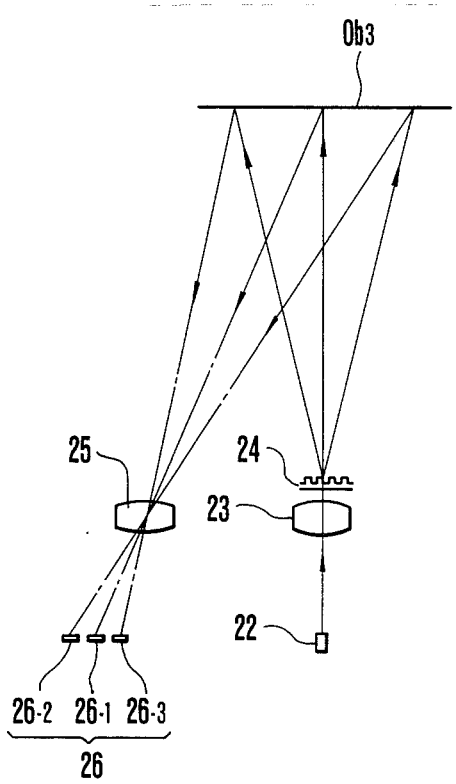
Figure 22:
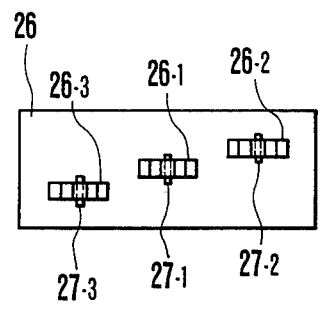

FIG. 21 shows another embodiment of this invention. FIG. 21 includes a light emission source 22; a light projecting lens 23; a beam splitter 24 which is identical with the beam splitter 5 of the preceding embodiment; a light receiving lens 25; and a photo-electric detector 26 which consists of photo-electric sensors 26-1, 26-2 and 26-3. In this embodiment, the light emission source 22 is stationary. The structural arrangement of the photo-electric detector 26 differs from that of the preceding embodiment. In this embodiment, the light projecting optical system is arranged to project rectangular light spots on the object. Meanwhile, each of the photo-electric sensors 26-1, 26-2 and 26-3 consists of an array of many photo-electric sensor parts. Three projected light spots are imaged on the photo-electric detector 26 via the light receiving lens 25. These images are formed on the arrays of sensor parts of the detector 26 as images 27-1, 27-2 and 27-3, as shown in FIG. 22. In the event of various distances of the object, the images 27-1, 27-2 and 27-3 on the photo-electric sensors 26-1, 26-2 and 26-3 are displaced sideways to a slight extent respectively. Object distance information of each distance measuring area is obtained by detecting the location for one of the sensor parts that produces a strong output among each array of the photo-electric sensor parts.

Figure 23:
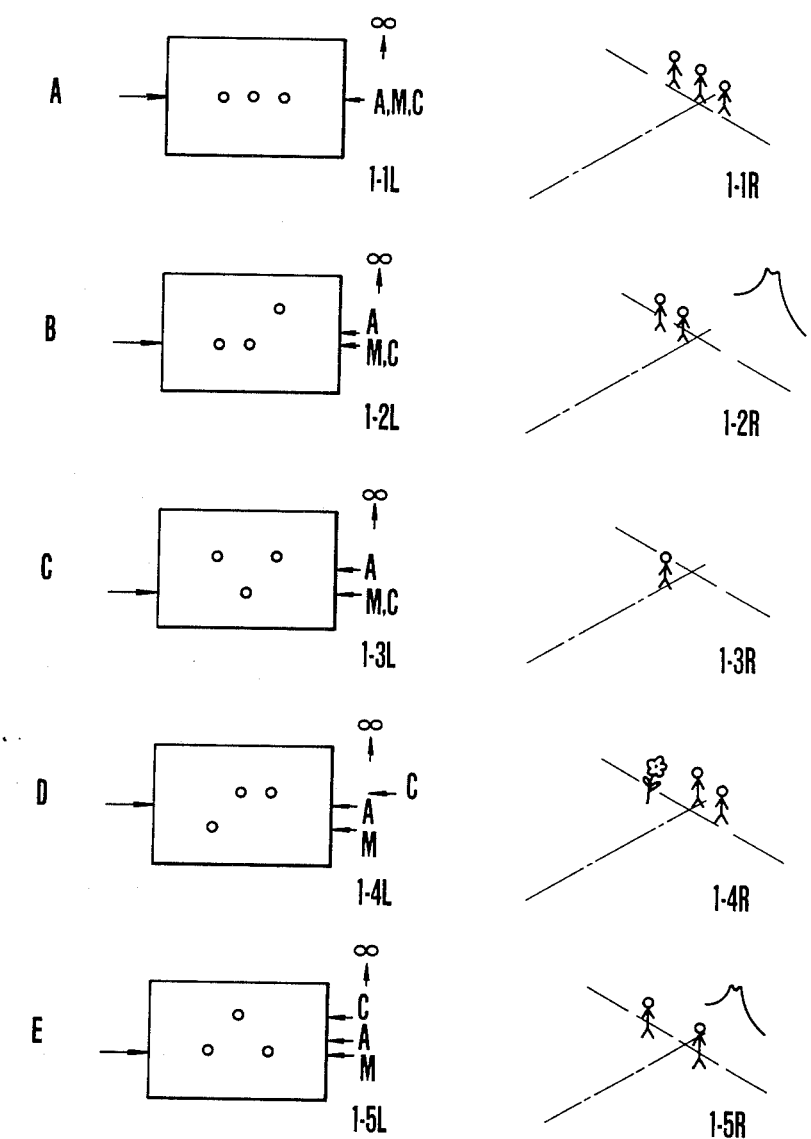
FIGS. 23 through 26 are illustrations of yet another embodiment of the invention.

FIGS. 23 through 26 show a further embodiment of the invention. In this embodiment, a highly accurate distance measuring operation is performed by a combination of various modes of distance measurement including: (1) A mode in which reflected light fluxes coming from many light spots formed on the object as a result of a multiplicity of projected light fluxes projected in the manner described in any of the preceding embodiments are received and a mean value of them is obtained (a multi-point averaging light receiving mode); (2) a mode in which a reflected light flux coming from the central part of the many light spots formed on the object as a result of the above-stated multiplicity of projected light fluxes is received and used for distance measurement (a center distance measurement); and (3) another mode in which reflected light fluxes coming from adjacent light spots among the many light spots on the object are received and used for distance measurement (a two-angle light receiving mode). The operating principle of the embodiment is shown in FIG. 23. In FIG. 23, the lateral positions of objects which are to be measured are shown on the right hand side while their relative distances to the distance measurement device are shown on the left hand side. Symbol A of FIG. 23 represents an example of the conventional average distance measuring operation. Reference symbol M denotes the result of measurement for the nearest distance, and C denotes an example of measurement performed only for the central part. In the case of a flat object plane as shown in Example A, all the results of distance measurement become the same. In Example B, where there is faraway background scenery on the side of the central part, the averaging distance measuring mode is influenced by the background scenery and thus results in a correct focus plane beyond the persons to be photographed. Example C represents a case where an object to be photographed is located in the center. In this case, the average distance measurement also results in a correct focus plane.

In case an intended picture is composed with a foreground arranged as shown in Example D of FIG. 23, a distance measuring mode having a preference to the nearest distance is influenced by the foreground and results in a correct focus plane in front of the object to be photographed. Where two persons are to be photographed with a background in the central part of the picture as shown in Example E of FIG. 23, not only a central part distance measuring mode but also an average distance measuring mode result in a correct focus plane beyond the object.

This embodiment is arranged to permit accurate automatic distance measurement for overcoming the above problems with conventional automatic focusing or distance measuring operations. In addition to a system for multi-point average distance measurement, the embodiment includes a system which is not only capable of coping with the above-stated situations represented by Examples B and E, in accordance with the results of distance measurement on a plurality of distance measuring points, but which is also not affected by a single foreground object as shown in Example D. The system also attaches importance to the result of distance measurement on the central part.

Figure 24:
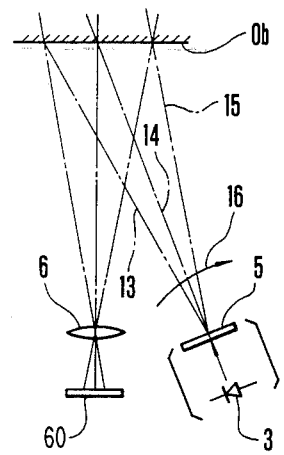
Figure 25:
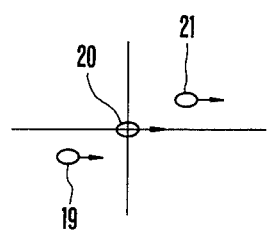

Referring to FIG. 24, a light emitting element 3 and an optical member 5 are arranged to project on the surface of an object Ob three light beams or fluxes 13, 14 and 15 at somewhat different angles to form scanning light spots on the surface of the object as shown in FIG. 25. The object is scanned with these beams of light from the nearest distance point to an infinite distance point. Concurrently with this scanning operation, a photo-taking lens (not shown) is focused on the object. An automatic focusing operation is accomplished by bringing the scanning operation to a stop with a distance measurement signal produced when the photo-taking lens comes to an in-focus position.

The scanning operation over the surface of the object results in reflected light fluxes or beams. The reflected light beams are projected on a light receiving photo-electric converting element 60. The plurality of the projected light beams 13, 14 and 15 are thus reflected by the object Ob and come to the photo-electric converting element 60 to form a plurality of light spots on the element 60 as shown in FIG. 25. In FIG. 25, arrows 19, 20 and 21 indicate the loci of movement of the light spots resulting from turning movement of the light emitting element 3.

Figure 26:
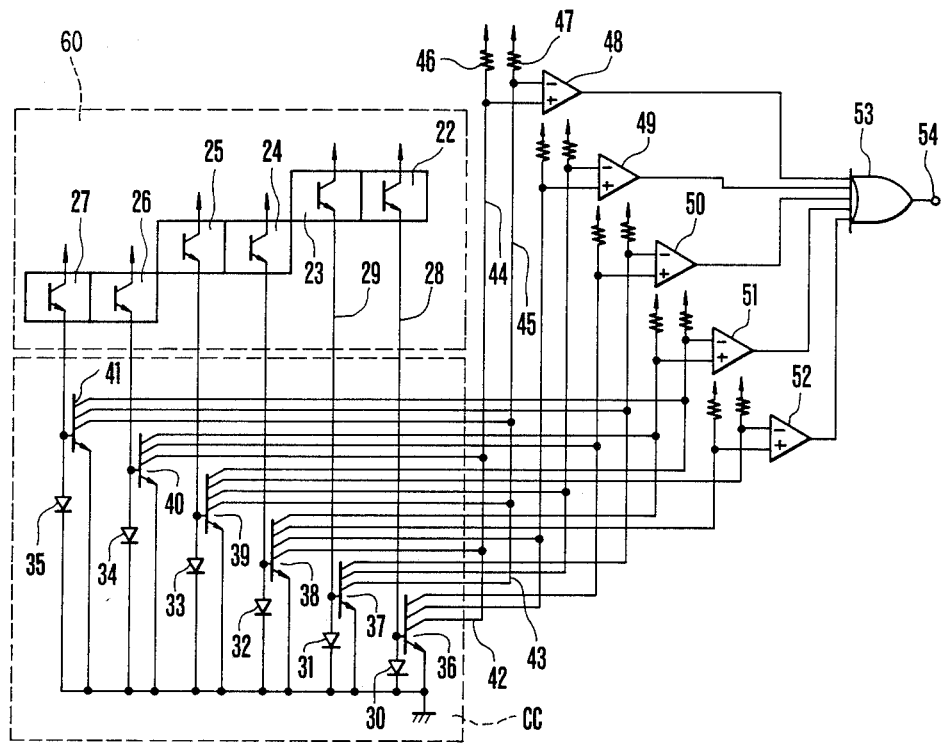

FIG. 26 shows the arrangement of the photo-electric converting element 60 together with a signal processing circuit which is arranged to produce the above-stated distance measurement signal by processing the outputs of the photo-electric converting element 60. The photo-electric converting element 60 consists of three light receiving areas (22, 23), (24, 25) and (26, 27). Each of these light receiving areas is divided into two light receiving parts. The light receiving state of the light receiving part shifts as each of the light spots moves from 22 to 23, from 24 to 25 and from 26 to 27. Each of the light receiving parts 22–27 is composed of a photo transistor. The output terminals of these photo transistors are connected to the base terminals of transistors 36–41 provided for detecting the output of a current mirror circuit CC. The emitter terminals of the transistors 36–41 are connected to the input terminals of comparators 48–52 which are provided for detecting the distance measurement signal. The quantity of light received by the light receiving part varies as the light spots move over photo-electric converting element 60, i.e. changes take place in the photo current outputs of the photo transistors. More specifically, when the light spot moves from the light receiving part 22 to the next light receiving part 23, an increase in the current which occurred in the beginning in line 28 shifts to another line 29. Each of the photo currents thus produced is inverted by current mirror circuits which are composed of diodes 30–35 and transistors 36–41.

By this, the light quantity change 22 to 23 is converted into a current increase 28 to 29 and another current increase 42 to 43. As a result, a current corresponding to the received light quantity of the light receiving parts 22, 24 and 26 flows through a line 44 while another current which corresponds to the received light quantity of the light receiving parts 23, 25 and 27 flows through a line 45. In this manner, distance measurement can be accomplished by averaging the light quantities of the light spots. These currents are converted into voltages by resistors 46 and 47. The shift of light quantity change from the part 22 to 23 results in a shift of current change from the line 44 to the line 45, i.e. a rise of voltage of the line 44 and a voltage drop of the line 45.

Then, the comparator 48 produces a signal the level of which becomes high when the light spots come to a central point on the average.

The comparator 49 likewise compares the light quantity of the parts 22 and 24 (22+24) with that of parts 23 and 25 (23+25). The comparator 50 compares the light quantity of the parts 22 and 26 (22+26) with that of the parts 23 and 27 (23+27). The comparator 51 compares the light quantity of the parts 24 and 26 (24+26) with that of the parts 25 and 27 (25+27). Another comparator 52 is arranged to compare the light quantity of the central distance measuring or light receiving part 24 with that of another central part 25.

The comparator 48 thus produces a distance measurement output which is obtained by averaging the light quantities of three points. The other comparators 49–51 produce distance measurement outputs each of which is obtained by comparing two of three points. Meanwhile, another comparator 52 produces a distance measurement output obtained by comparing the central points.

An OR gate 53 is arranged to take the logical sum of the outputs of these comparators. Then, a terminal 54 produces a high level output when any of the outputs reach an in-focus state earlier than the others during the distance measuring scanning process. With the high level output produced from the terminal 54, focusing adjustment is accomplished by bringing the automatic distance measuring operation to a stop during the scanning process.

In this particular embodiment, two out of three distance measuring fields are arranged to be divided into many parts. However, the invention is not limited to that arrangement. For example, three out of five fields can be so expanded.

The use of photo transistors may be replaced with the use of similar elements for the photo-electric converting part.

Further, the practical circuit arrangement is not limited to the use of currents. Other suitable arrangements such as the use of MOS, CCD's likewise permit a similar logical determining arrangement.

In accordance with the invention, automatic distance measurement can be facilitated by virtue of the results of a multiplicity of distance measuring processes carried out on the basis of a multiplicity of distance measuring fields. Further, the combined use of high sensitivity photo transistors and highly accurate current mirror circuits facilitates a multiplicity of processing operations in parallel with each other. The invented arrangement is readily practical through use of the bipolar technique in combination comparators.

What we claim:

1. A distance measuring device, comprising:
   light emitting means for projecting a light flux for distance measurement;
   an optical member arranged to divide and split said projected light flux emitted by said light emitting means into a plurality of projection light fluxes;
   scanning means for scanning with the plurality of projection light fluxes produced by said optical member;
   photo-electric converting means arranged to receive reflected light fluxes resulting from said plurality of projected light fluxes, said converting means having a plurality of light receiving areas, each of said light receiving areas being arranged to produce a photo-electric converted signal representing a light flux incident thereon as a result of said scanning with said projected light fluxes; and
   a circuit for receiving said photo-electric converted signals and producing distance measurement signals, said circuit being arranged to select, as an in-focus signal, any distance measurement signal that first becomes a value close to an in-focus value from distance measurement signals representing the mean value of the photo-electric converted signals from said light receiving areas of the photo-electric converting means, the output value of the photo-electric converted signals from a central part of the light receiving areas and a plurality of combined output values of the photo-electric converted signals from said light receiving areas from among said plurality of light receiving areas.

2. A light projecting device for distance measurement, comprising:
   light emitting means for emitting and projecting light for distance measurement and for rotating such that a light spot therefrom scans between a close distance and a longer distance;
   a light projecting lens arranged to direct the light projected by said light emitting means to an object whose distance is to be measured; and
   a diffraction grating for diffracting the projected light into a zero order diffracted light and (+) and (−) first order diffracted light to project a plurality of spot lights onto the object.

3. A light projecting device according to claim 2, characterized said diffraction grating having recesses and protrusions adjusted that an intensity of the three lights diffracted by said diffraction grating corresponds to one of the following three cases:
   (a) the intensities of the three lights diffracted by the diffraction grating are equal;
   (b) intensity of said zero order diffracted light is weaker than intensity of said (+) and (−) first order diffracted light; and
   (c) the intensity of said zero order diffracted light is stronger than the intensity of the (+) and (−) first order diffracted light.

4. A light projecting device for distance measurement, comprising:
   light emitting means for emitting and projecting light for distance measurement;
   a light projecting lens arranged to direct the light projected by said light emitting means to an object whose distance is to be measured; and
   a diffraction grating for diffracting the projected light, said diffraction grating having grating lines tilted to a predetermined angle relative to a reference line vertical to the optical axis of said light flux, and a connecting line connecting spots on a surface of an object formed by a zero order diffracted light and (+) and (−) first order lights diffracted by said diffraction grating is tilted relative to the horizontal direction.

5. A light projecting device for distance measurement, comprising:
   light emitting means for emitting and projecting light for distance measurement;
   a light projecting lens arranged to direct the projected light of said light emitting means to an object whose distance is to be measured; and
   a diffraction grating for diffracting the light and projecting a zero order diffracted light and (+) and (−) first order diffracted lights onto an object, said lights diffracted by said diffraction grating being adjusted to any one of the following:
   (i) intensities of the three lights diffracted by the diffraction grating are equal;
   (ii) intensity of said zero order diffracted light is stronger than intensity of said (+) and (−) first order diffracted lights, or;
   (iii) the intensity of said zero order diffracted light is weaker than the intensity of said (+) and (−) first order diffracted light.

6. A distance measurement device, comprising:
   light emitting means for projecting light for distance measurement;
   a diffraction grating for diffracting the light into a zero order diffracted light and (+) and (−) first order diffracted lights and projecting a plurality of projected light spots onto an object;
   driving means for inserting and retracting said diffraction grating into and from a light path of said projected light;
   light receiving means having three receiving areas for receiving said three diffracted lights from said diffraction grating to produce signals from said three receiving areas corresponding to the intensity of the diffracted light impinging into a respective area when said diffraction grating is placed within said optical path of the projected light, and to produce signals corresponding to an intensity of light of the diffracted light impinging into a receiving area at a central part out of said three receiving areas when the diffraction grating is not placed within the optical path for the projected light.

* * * * *